(12) United States Patent
Hiratsuka

(10) Patent No.: US 10,693,311 B2
(45) Date of Patent: Jun. 23, 2020

(54) CHARGING DEVICE

(71) Applicant: MIRAI-LABO KABUSHIKI KAISHA, Hachioji-shi (JP)

(72) Inventor: Toshio Hiratsuka, Hachioji (JP)

(73) Assignee: MIRAI-LABO KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 16/061,410

(22) PCT Filed: Dec. 14, 2016

(86) PCT No.: PCT/JP2016/087135
§ 371 (c)(1),
(2) Date: Jun. 12, 2018

(87) PCT Pub. No.: WO2017/104681
PCT Pub. Date: Jun. 22, 2017

(65) Prior Publication Data
US 2019/0341800 A1    Nov. 7, 2019

(30) Foreign Application Priority Data

Dec. 15, 2015 (JP) ................................ 2015-244349

(51) Int. Cl.
*H02J 7/35*  (2006.01)
*H01M 10/0525*  (2010.01)
(Continued)

(52) U.S. Cl.
CPC .......... *H02J 7/35* (2013.01); *H01M 10/0525* (2013.01); *H01M 10/44* (2013.01);
(Continued)

(58) Field of Classification Search
USPC .......................................................... 320/101
See application file for complete search history.

(56) References Cited

U.S. PATENT DOCUMENTS

| 6,664,000 B1 | 12/2003 | Sonobe |
| 8,970,161 B1 * | 3/2015 | Cuadros ................ H02J 7/0068 320/101 |

(Continued)

FOREIGN PATENT DOCUMENTS

| JP | H03-036932 A | 2/1991 |
| JP | 2001-102092 A | 4/2001 |

(Continued)

OTHER PUBLICATIONS

International Search Report dated Feb. 14, 2017, issued for PCT/JP2016/087135.

*Primary Examiner* — Robert Grant
(74) *Attorney, Agent, or Firm* — Locke Lord LLP

(57) ABSTRACT

A charging device is provided, which is capable of starting up a control circuit without any separate power supply so as to start an appropriate charge operation even when a secondary battery is in an overdischarged state. A charging device to charge a secondary battery with electric power generated by a solar cell includes: a charging control unit that controls the electric power generated by the solar cell to have a current value and/or a voltage value suitable for charging, and that supplies the controlled electric power to the secondary battery; and a start-up control unit that supplies, to the charging control unit, a boosted power source by boosting the electric power from the solar cell when charging is started, and that starts up the a charging control unit.

17 Claims, 3 Drawing Sheets

(51) Int. Cl.
*H01M 10/44* (2006.01)
*H01M 10/46* (2006.01)
*H02J 7/00* (2006.01)

(52) U.S. Cl.
CPC ........... *H01M 10/465* (2013.01); *H02J 7/008* (2013.01); *H02J 7/0029* (2013.01); *H02J 7/00306* (2020.01)

(56) References Cited

U.S. PATENT DOCUMENTS

2008/0150487 A1\* 6/2008 Liu ..................... H02J 7/0075
 320/134
2011/0133685 A1\* 6/2011 Lee .................... H01M 10/052
 320/101

FOREIGN PATENT DOCUMENTS

| | | |
|---|---|---|
| JP | 2008-161034 A | 7/2008 |
| JP | 2014-007958 A | 1/2014 |
| JP | 2014-163809 A | 9/2014 |
| JP | 2014-209827 A | 11/2014 |

\* cited by examiner

CHARGING DEVICE

TECHNICAL FIELD

The present invention relates to a charging device, and particularly to a charging device to charge a lithium-ion battery with electric power generated by a solar cell.

BACKGROUND ART

Conventionally, photovoltaic charging devices are proposed, which charge a secondary battery with electric power generated by a solar cell so as to supply a current to a load (see Patent Documents 1 and 2). In such conventional technology, the electric power generated by the solar cell is controlled by a control circuit. For example, the electric power is subjected to pulse width modulation (PWM) control so as to have a waveform (voltage waveform and/or current waveform) suitable for charging the secondary battery.

When the conventional photovoltaic charging device is used for installed equipment such as a residence or a streetlight, a lead-acid battery is adopted as the secondary battery, and the lead-acid battery is continuously connected to a terminal of the control circuit. In this way, when using the photovoltaic charging device for the installed equipment, the charged state of the secondary battery can be appropriately and constantly controlled by the control circuit, which prevents the secondary battery from being in an overdischarged state.

PRIOR ART DOCUMENTS

Patent Documents

[Patent Document 1] JP 2014-163809 A
[Patent Document 2] JP 2014-209827 A

SUMMARY OF THE INVENTION

Problem to be Solved by the Invention

However, when the photovoltaic charging device is made portable and used under the environment where power infrastructure is not sufficiently developed or for the purpose of assisting disaster area, it is desirable to adopt, as the secondary battery, a lithium-ion battery that has a weight lighter than the lead-acid battery, which means that a plurality of secondary batteries is replaced with one another for charging. Taking into account the situation in which the secondary battery to be charged should be frequently exchanged, the secondary battery may be sometimes in the overdischarged state because the electric power charged in the secondary battery has been used up.

In order to appropriately charge the secondary battery, it is necessary to start up the control circuit. However, when the exchanged secondary battery to be charged is in the overdischarged state, it cannot supply electric power required to start up the control circuit. Thus, it is difficult to start up the control circuit that is necessary to start charging. Still, it is not preferable to include another power supply to start up the control circuit in the photovoltaic charging device, because it may affect the portability of the photovoltaic charging device.

The present invention was made in consideration of the above circumstances, an object of which is to provide a charging device capable of starting up a control circuit without any separate power supply so as to start an appropriate charge operation even when a secondary battery is in an overdischarged state.

Means for Solving the Problem

In order to resolve the above problem, a charging device of the present invention, which charges a secondary battery with electric power generated by a solar cell, includes: a charging control unit connected to the solar cell; a step-up power supply connected to the solar cell and further connected, via a terminal section, to the secondary battery; and a start-up control unit connected to the charging control unit and further connected, via the terminal section, to the secondary battery. The charging control unit controls the electric power generated by the solar cell to have a current value and/or a voltage value suitable for charging, and supplies the controlled electric power to the secondary battery. The step-up power supply boosts the electric power from the solar cell. The start-up control unit connects the step-up power supply and the charging control unit when charging is started and supplies the boosted electric power to the charging control unit so as to start up the charging control unit.

The charging device as described above can start up the charging control unit without any separate power supply so as to start an appropriate charge operation even when the secondary battery is in an overdischarged state.

In an embodiment of the present invention, the start-up control unit stops the supply of the current from the charging control unit to the secondary battery when a voltage of the secondary battery is lower than a predetermined value, and thus, the start-up control unit precharges the secondary battery using the step-up power supply.

In an embodiment of the present invention, the electric power generated by the solar cell is subjected to PWM control and to smoothing by the charging control unit so as to be supplied to the secondary battery.

In an embodiment of the present invention, the secondary battery is a lithium-ion battery.

Effects of the Invention

A charging device capable of starting up a control circuit without any separate power supply is provided so as to start an appropriate charge operation even when a secondary battery is in an overdischarged state.

MODES FOR CARRYING OUT THE INVENTION

First Embodiment

Figure 1:
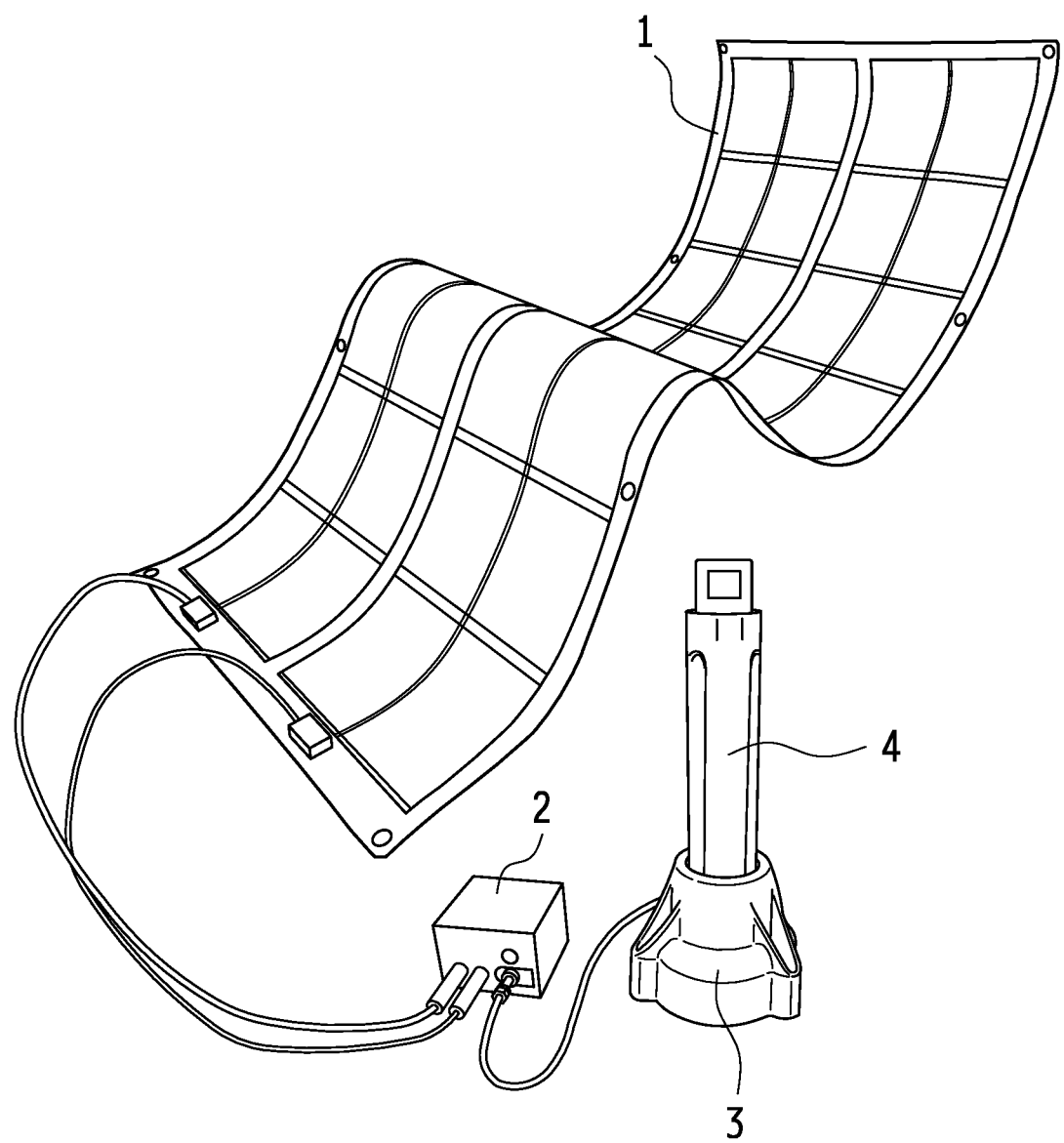
FIG. 1 is a schematic diagram showing a photovoltaic power generation system using a charging device of a first embodiment.

A detailed description will be given on a first embodiment of a charging device according to the present invention with reference to the drawings. FIG. 1 is a schematic diagram showing a photovoltaic power generation system using a charging device of this embodiment. As shown in FIG. 1, a photovoltaic power generation system 100 includes a solar cell module 1, a charging controller 2, a charging cradle 3 and a secondary battery module 4.

The solar cell module 1 is made by packaging solar cell elements to be irradiated with sunlight and the like to obtain electromotive force. The solar cell module 1 is connected to the charging controller 2 via terminals so as to supply electric power to the charging controller 2. Materials for the solar cell element that constitutes the solar cell module 1 are not particularly limited. A plurality of solar cell elements may be connected in series or in parallel, as needed. It is preferable to use a flexible thin film solar cell for the solar cell module 1 so as to save the weight and improve the portability of the photovoltaic power generation system 100.

The charging controller 2 is a charging device of the present invention, which is electrically connected respectively to the solar cell module 1 and the charging cradle 3. As described later, the charging controller 2 converts electric power supplied from the solar cell module 1 into a waveform suitable for charging, by a circuit housed therein, so as to supply it to the charging cradle 3.

The charging cradle 3 is to charge the secondary battery module 4 that is placed thereon. The charging cradle 3 has a configuration so that the secondary battery module 4 can be easily attached to/detached from the charging cradle 3. The charging cradle 3 ensures the electrical connection necessary to charge the secondary battery module 4 in a state in which the secondary battery module 4 is installed on the charging cradle 3. Here, a configuration is exemplarily described, in which the charging controller 2 and the charging cradle 3 are separate elements whose terminals are connected to each other via a cable. However, the charging controller 2 and the charging cradle 3 may be formed integrally so that the circuit of the charging controller 2 is housed inside the charging cradle 3.

The secondary battery module 4 is made by packaging a secondary battery for storing the electric power generated by the solar cell module 1. The secondary battery module 4 has a configuration so as to be attached to/detached from the charging cradle 3, and has a terminal via which the electric power is supplied from the charging cradle 3. When the secondary battery module 4 is installed on the charging cradle 3, the electrical connection among the solar cell module 1, the charging controller 2 and the charging cradle 3 is ensured. Also, circuits such as a protection circuit and a discharge control circuit are mounted on the secondary battery module 4 so as to control and supply the current to a load. Furthermore, when the secondary battery module 4 is in the fully charged state, the supply of the electric power from the charging cradle 3 may be interrupted, and when the secondary battery module 4 has a voltage less than a predetermined voltage value, the discharge may be stopped.

Materials for the secondary battery that is mounted on the secondary battery module 4 are not limited. Examples of the materials include: a lead-acid battery; a nickel-metal hydride battery; and a lithium-ion battery. It is preferable to use a lithium-ion battery in order to improve the portability of the photovoltaic power generation system 100. In the photovoltaic power generation system 100 of this embodiment, a plurality of secondary battery modules 4 is replaced with one another to be installed on/charged from the charging cradle 3. The charged secondary battery module 4 is detached from the charging cradle 3 and used as a power supply for a loading device such as a lighting device (not shown).

Figure 2:
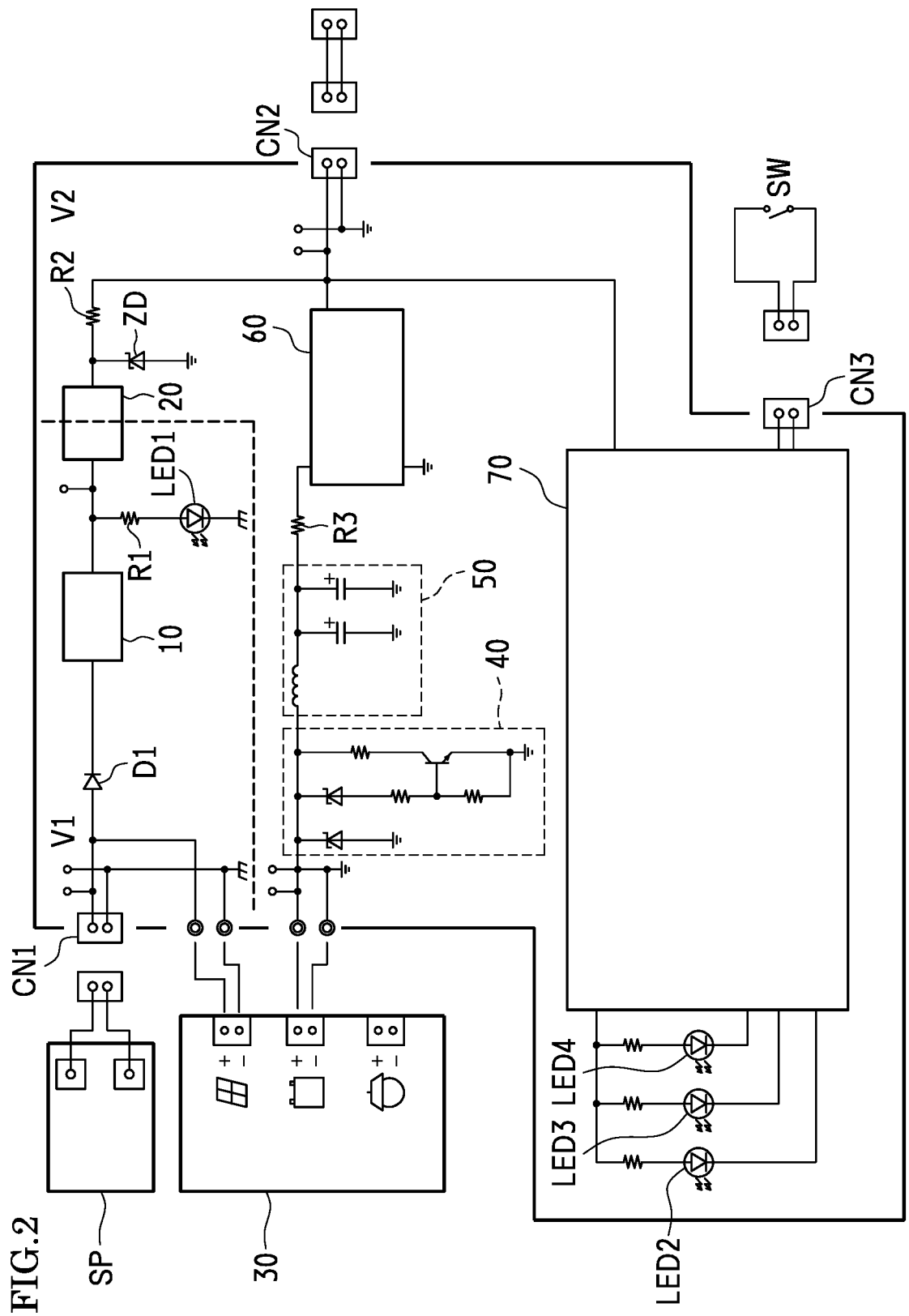
FIG. 2 is a circuit diagram showing a circuit configuration housed in a charging controller 2 of the first embodiment.

FIG. 2 is a circuit diagram showing a circuit configuration housed in the charging controller 2 of this embodiment. As shown in FIG. 2, the charging controller 2 includes: a first step-down unit 10; a second step-up unit 20; a charging control unit 30; an overvoltage protection unit 40; a smoothing unit 50; a start-up control unit 60; a remaining quantity indicating unit 70; LEDs 1 to 4; a diode D1; a zener diode ZD; resistors R1 to R3; and terminal sections CN1 to CN3. Here, the ground potential to the diode D1, the first step-down unit 10, the resistor R1, the LED 1 and the input side of the second step-up unit 20 is floated from the ground potential to the other components.

The terminal sections CN1 to CN3 are terminals to electrically connect the charging controller 2 to the outside. The terminal section CN1 is connected to the solar cell module 1 indicated by the sign "SP" in FIG. 2. The terminal section CN2 is connected to the secondary battery module 4 via the charging cradle 3. The terminal section CN3 is connected to a switch indicated by "SW". In the example described here, the terminal section CN3 is provided so as to be connected to the outside switch SW. However, the switch SW may be included in the circuit of the charging controller 2.

The diode D1 is a diode that is connected in the forward direction between the positive pole side of the terminal section CN1 and the first step-down unit 10. The diode D1 is to protect the circuit against the reverse connection when the positive and negative poles of the solar cell module 1 are reversely connected to the terminal section CN1.

The first step-down unit 10 is a circuit component disposed between the diode D1 and the second step-up unit 20. The first step-down unit 10 is a step-down circuit to adjust the voltage supplied from the solar cell module 1. The voltage of the electric power generated by the solar cell module 1 fluctuates due to the amount of incident light that changes depending on the weather. Thus, the voltage is adjusted by the first step-down unit 10 to the desired voltage, which is output to the second step-up unit 20. For example, the voltage that is output from the first step-down unit 10 is preferably about 5V.

The LED 1 and the resistor R1 constitute an input display part. They are connected in series between the first step-down unit 10 and the second step-up unit 20, and grounded. The LED 1 is lit when the output from the first step-down unit 10 has a predetermined voltage or more, thereby indicates that the electric power from the solar cell module 1 is input to the charging controller 2.

The second step-up unit 20 is a circuit component disposed between the first step-down unit 10 and the resistor R2. The second step-up unit 20 is a step-up circuit to boost the output from the first step-down unit 10. The voltage of the output from the first step-down unit 10 is not sufficient to precharge the secondary battery module 4 and to start up the charging control unit 30 (described in detail later). Thus, the second step-up unit 20 boosts the voltage to a required voltage to perform precharging and start-up operation. For example, the second step-up unit 20 outputs the electric power boosted up to about 12V.

The resistor R2 is a resistor that is connected between the second step-up unit 20 and the terminal section CN2. The resistor R2 serves as a current limiting resistor that limits the current value of the output from the second step-up unit 20 to a predetermined value. The zener diode ZD is a zener diode that is disposed so as to be connected to the output of the second step-up unit 20. The zener diode ZD is to flow the current so as to protect the circuit against the overvoltage when the voltage value of the output from the second step-up unit 20 is a predetermined value or more.

Here, the circuit constituted by the diode D1, the first step-down unit 10, the second step-up unit 20 and the resistor R2 serves as a step-up power supply that boosts and outputs the electric power generated by the solar cell module 1.

The charging control unit 30 is a circuit component that is connected to the terminal section CN1 and to the overvoltage protection unit 40. The charging control unit 30 controls the electric power supplied from the solar cell module 1 to have a current value and/or voltage value suitable for charging the secondary battery module 4, and outputs the controlled electric power to the overvoltage protection unit 40. In particular, the charging control unit 30 outputs a pulse waveform of the current value and/or voltage value suitable for charging by the conventionally used pulse width modulation (PWM) control. The specific configuration of the charging control unit 30 is not limited, and it is also possible to use a publicly-known charging and discharging circuit for lead-acid battery, on which various ICs and the like are mounted.

The overvoltage protection unit 40 is a circuit component that is connected between the charging control unit 30 and the smoothing unit 50. The overvoltage protection unit 40 is an overvoltage protection circuit to flow the current to the ground potential when the output from the charging control unit 30 has the predetermined voltage value or more. The smoothing unit 50 is a circuit component that is connected between the overvoltage protection unit 40 and the resistor R3. The smoothing unit 50 smooths and outputs the current of the pulse waveform from the charging control unit 30. The pulse waveform, after smoothed by the smoothing unit 50, is a waveform suitable for a lithium-ion battery as the secondary battery module 4.

In the example described here, the charging control unit 30, the overvoltage protection unit 40 and the smoothing unit 50 are separately formed. However, the overvoltage protection unit 40 and the smoothing unit 50 may be included in the charging control unit 30. In this case, the electric power generated by the solar cell module 1 is subjected to the PWM control and to smoothing, after that it is output from the charging control unit 30.

The resistor R3 is a resistor that is connected between the smoothing unit 50 and the start-up control unit 60. The resistor R3 is a rush current limiting resistor to prevent the rush current. In the example described here, the resistor R3 is disposed independently from the other circuit components. However, it may be included in the output side of the smoothing unit 50, or in the input side of the start-up control unit 60.

The start-up control unit 60 is a circuit component that is connected between the resistor R3 and the terminal section CN2. The start-up control unit 60 includes various ICs and transistors. As shown in FIG. 2, the output side of the resistor R2 is connected between the start-up control unit 60 and the terminal section CN2, thus the start-up control unit 60 and the resistor R2 are connected in parallel to each other relative to the terminal section CN2. The start-up control unit 60 is to switch the operation among: a start-up operation to supply a start-up voltage to the charging control unit 30 so as to start up the charging control unit; a precharge operation when the secondary battery module 4 is in the overdischarged state; and a normal charge operation using the charging control unit 30. The detailed operations of the start-up control unit 60 will be described later.

The remaining quantity indicating unit 70 is a circuit component that is connected between the terminal section CN2 and the terminal section CN3, to which the LEDs 2 to 4 are connected in parallel. As described above, the switch SW is connected to the terminal section CN3. When the switch SW is turned on, the remaining quantity indicating unit 70 detects the potential of the secondary battery module 4 via the terminal section CN2, and lights the LEDs 2 to 4 according to the detected potential so as to indicate the charged state of the secondary battery module 4. For example, when the secondary battery module 4 is at a low potential and nearly in the overdischarged state, only the LED 2 is lit. When the secondary battery module 4 is in the intermediate state between the overdischarged state and the fully charged state, the LEDs 2 and 3 are lit. When the secondary battery module 4 is in the fully charged state, the LEDs 2 to 4 are lit. In the example described here, three LEDs are used. However, the number of the LEDs is not limited. Also, it is possible to use a digital display plate or an image display part.

Figure 3:
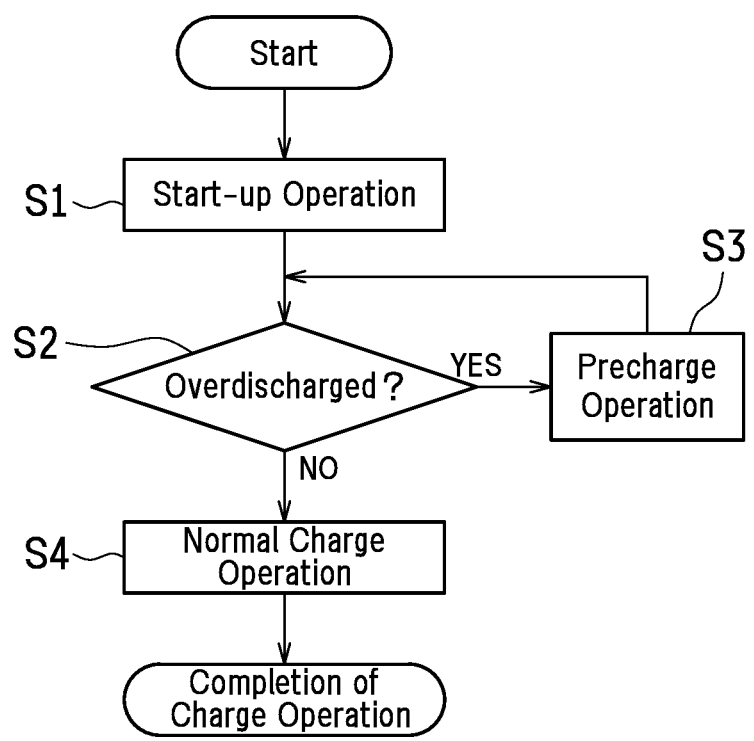
FIG. 3 is a flowchart showing operations of a start-up control unit 60 of the first embodiment.

Now, the operations of the charging device of this embodiment are described with reference to FIG. 3. FIG. 3 is a flowchart showing the operations of the start-up control unit 60 of this embodiment. First, in the starting step, when the solar cell module 1 is connected to the terminal section CN1 and generates electric power by being irradiated with light, the potential V1 of the solar cell module 1 is boosted via the first step-down unit 10 and the second step-up unit 20, so that the boosted potential V2 is supplied to the output end of the resistor R2. As described above, when the output voltage of the first step-down unit 10 reaches the predetermined voltage, the LED 1 is lit to indicate that the solar cell module 1 is generating electric power. Since the charging control unit 30 is also connected to the terminal section CN 1, the electric power generated by the solar cell module 1 is supplied to the charging control unit 30.

Next, the procedure advances to the start-up operation step as step S1, in which the charging control unit 30 is started up. When starting up the charging device in the beginning, no electric power to operate the circuit is supplied to the charging control unit 30. Then, the start-up control unit 60 performs the start-up operation to connect the output end of the resistor R2 to the resistor R3. In this way, the boosted potential V2 is applied to the resistor R3, and the start-up voltage is supplied to the charging control unit 30 via the smoothing unit 50 and the overvoltage protection unit 40. Since the start-up voltage is a boosted voltage of part of the electric power generated by the solar cell module 1, the start-up voltage can start up the charging control unit 30 regardless of the connected state or the charged state of the secondary battery module 4.

Next, the procedure advances to the overdischarged state determination step as step S2, in which it is determined whether the secondary battery module 4 is in the overdischarged state or not. In step S2, since the start-up of the charging control unit 30 has been completed in step S1, the start-up control unit 60 interrupts the connection between the output end of the resistor R2 and the resistor R3, thus the connection between the terminal section CN2 and the resistor R3 is also interrupted. Accordingly, the charging control unit 30 determines that the secondary battery module 4 is not connected, and stops the charge operation using the PWM control.

At the same time, the start-up control unit 60 measures the potential of the secondary battery module 4 via the terminal section CN2 so as to recognize its charged state. At this time, although the boosted potential V2 is output to the output end of the resistor R2 that is connected to the terminal section CN2, the charged state of the secondary battery module 4 is reflected in the measurement result because the impedance of the secondary battery module 4 is large.

In step S2, when the potential of the secondary battery module 4 measured by the start-up control unit 60 is less than the predetermined voltage value, it is determined that the secondary battery module 4 is in the overdischarged state, and the procedure advances to step S3. When the potential of the secondary battery module 4 is equal to or more than the predetermined voltage value, then the procedure advances to step S4. As to the predetermined voltage value, it is determined based on the materials and the structure of the secondary battery module 4. For example, it may be set to about 10V.

In step S3, the overdischarged secondary battery module 4 is subjected to the precharge operation. In the precharge operation, the start-up control unit 60 maintains the state in which the connection between the output end of the resistor R2 and the resistor R3 is interrupted. At this time, since the output end of the resistor R2 is being connected to the terminal section CN2, the precharge operation is a supply of the electric power generated by the solar cell module 1 to the secondary battery module 4 via the first step-down unit 10, the second step-up unit 20 and the resistor R2.

After step S3, the procedure returns to the overdischarged state determination step in step S2, thus the precharge operation in step S3 is repeatedly preformed until the charged state of the secondary battery module 4 reaches the predetermined potential. In case of using the lithium-ion battery as the secondary battery module 4, if the lithium-ion battery is left in the overdischarged state for a long time, the inside of the battery may be short-circuited due to deposition of lithium metal. When the battery in the short-circuited state is charged with the large current, the secondary battery module 4 may generate heat. Therefore, it is necessary to take measures for preventing heat generation. When the secondary battery module 4 is in the short-circuited state due to deposition of lithium metal, the potential of the secondary battery module 4 does not reach the predetermined voltage value. Thus, the precharging is continued with the current limited to less than the current in the normal charge operation by the resistor R2. As a result, it is possible to avoid the charging with the large current.

In step S4, the normal charge operation is performed by supplying the current for normal charging from the charging control unit 30 to the secondary battery module 4. In the normal charge operation, the start-up control unit 60 electrically connects the output end of the resistor R2 and the terminal section CN2 to the resistor R3 and maintains the connection. From this, the charging control unit 30 determines that the secondary battery module 4 is connected, and maintains the charge operation using the PWM control. The output from the charging control unit 30 is supplied to the secondary battery module 4 via the overvoltage protection unit 40, the smoothing unit 50, the resistor R3, the start-up control unit 60 and the terminal section CN2. In this way, the electric power generated by the solar cell module 1 is controlled to have the current value and/or voltage value suitable for charging and supplied to the secondary battery module 4. The secondary battery module 4 detects, by the control circuit mounted thereon, the charged state of the internal secondary battery. Thus, the normal charge operation is completed when the internal secondary battery is in the fully charged state.

As described above, in the photovoltaic power generation system 100 of this embodiment, the fully charged secondary battery module 4 is detached and used as the power supply for another electrical device. Also, the secondary battery module 4 that has been used for another electrical device is newly attached to the charging cradle 3 and charged. In this operation, the procedure may start from the start-up operation in step S1 every time the new secondary battery module 4 is attached, or may start from the overdischarged state determination step in step S2 by maintaining the start-up state of the charging control unit 30.

As described above, the charging device of the present invention can start up the charging control unit 30 without any separate power supply so as to start an appropriate charge operation even when the secondary battery module 4 is in the overdischarged state. Furthermore, when the secondary battery module 4 is in the overdischarged state, the start-up control unit 60 stops the supply of the current from the charging control unit 30 to the secondary battery module 4, and precharges the secondary battery module 4 using the step-up power supply. Thus, the charge operation can be performed while preventing heat generation caused by the charging with the large current when the inside of the secondary battery module 4 is short-circuited due to deposition of lithium metal.

The present invention is not limited to the above-described embodiment, and various changes and modifications may be made within the scope of the appended claims. Any embodiments obtained by combination of the technical means disclosed in the above-described embodiments are intended to be embraced in the technical scope of the present invention.

DESCRIPTION OF THE REFERENCE NUMERALS

D1 Diode
CN1 to 3 Terminal sections
R1 to R3 Resistors
ZD Zener diode
1 Solar cell module
2 Charging controller
3 Charging cradle
4 Secondary battery module
10 First step-down unit
20 Second step-up unit
30 Charging control unit
40 Overvoltage protection unit
50 Smoothing unit
60 Start-up control unit
70 Remaining quantity indicating unit
100 Photovoltaic power generation system

The invention claimed is:

1. A charging device configured to charge a secondary battery with electric power generated by a solar cell, comprising:
   a charging control unit connected to the solar cell, the charging control unit being configured to:
      control the electric power generated by the solar cell to have a current value and/or a voltage value suitable for charging; and
      supply the controlled electric power to the secondary battery;
   a step-up power supply connected to the solar cell and further connected, via a terminal section, to the secondary battery, the step-up power supply being configured to boost the electric power from the solar cell; and a start-up control unit connected to the charging control unit and further connected, via the terminal section, to the secondary battery, wherein the start-up control unit connects the step-up power supply and the charging control unit when charging is started and supplies the boosted electric power to the charging control unit so as to start up the charging control unit, wherein the step-up power supply is connected between the solar cell and the terminal section along a first circuit path, the charging control unit is connected between the solar cell and the terminal section along a second circuit path different than the first circuit path.

2. The charging device according to claim 1, wherein the start-up control unit stops the supply of the current from the charging control unit to the secondary battery when a voltage of the secondary battery is lower than a predetermined value, and wherein the start-up control unit precharges the secondary battery using the step-up power supply.

3. The charging device according to claim 1, wherein the electric power generated by the solar cell is subjected to pulse width modulation control and to smoothing by the charging control unit so as to be supplied to the secondary battery.

4. The charging device according to claim 1, wherein the secondary battery is a lithium-ion battery.

5. The charging device according to claim 2, wherein the electric power generated by the solar cell is subjected to pulse width modulation control and to smoothing by the charging control unit so as to be supplied to the secondary battery.

6. The charging device according to claim 2, wherein the secondary battery is a lithium-ion battery.

7. The charging device according to claim 3, wherein the secondary battery is a lithium-ion battery.

8. The charging device according to claim 5, wherein the secondary battery is a lithium-ion battery.

9. The charging device according to claim 1, wherein the charging control unit and the step-up power supply are each separately connected to the solar cell, and the charging control unit is configured to supply the controlled electric power to the secondary battery after start up of the charging control unit.

10. A charging device configured to charge a secondary battery with electric power generated by a solar cell, comprising:

a charging control unit connected to the solar cell, the charging control unit being configured to:

control the electric power generated by the solar cell to have a current value and/or a voltage value suitable for charging; and supply the controlled electric power to the secondary battery;

a step-up power supply connected to the solar cell and further connected, via a terminal section, to the secondary battery, the step-up power supply being configured to boost the electric power from the solar cell; and a start-up control unit connected to the charging control unit and further connected, via the terminal section, to the secondary battery, wherein the start-up control unit connects the step-up power supply and the charging control unit when charging is started and supplies the boosted electric power to the charging control unit so as to start up the charging control unit, wherein the charging control unit and the step-up power supply are each separately connected to the solar cell, and the charging control unit is configured to supply the controlled electric power to the secondary battery after start up of the charging control unit.

11. The charging device according to claim 10, wherein the start-up control unit stops the supply of the current from the charging control unit to the secondary battery when a voltage of the secondary battery is lower than a predetermined value, and wherein the start-up control unit precharges the secondary battery using the step-up power supply.

12. The charging device according to claim 10, wherein the electric power generated by the solar cell is subjected to pulse width modulation control and to smoothing by the charging control unit so as to be supplied to the secondary battery.

13. The charging device according to claim 10, wherein the secondary battery is a lithium-ion battery.

14. The charging device according to claim 11, wherein the electric power generated by the solar cell is subjected to pulse width modulation control and to smoothing by the charging control unit so as to be supplied to the secondary battery.

15. The charging device according to claim 11, wherein the secondary battery is a lithium-ion battery.

16. The charging device according to claim 12, wherein the secondary battery is a lithium-ion battery.

17. The charging device according to claim 14, wherein the secondary battery is a lithium-ion battery.

* * * * *